Feb. 21, 1961  H. W. FERCHLAND  2,972,485
MAGNETIC CHUCK
Filed Dec. 3, 1958  3 Sheets-Sheet 1
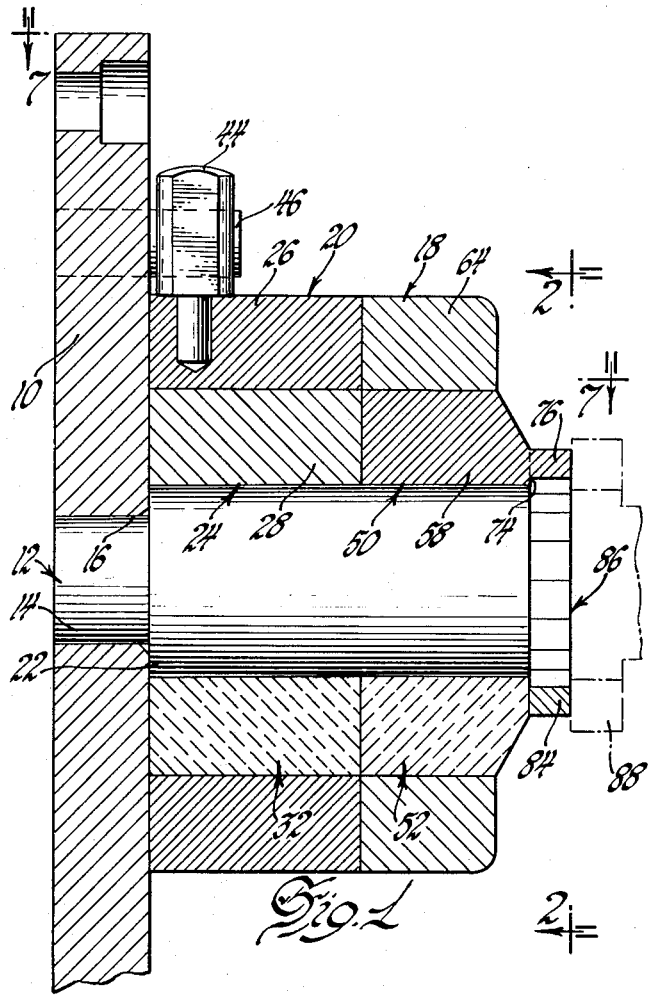
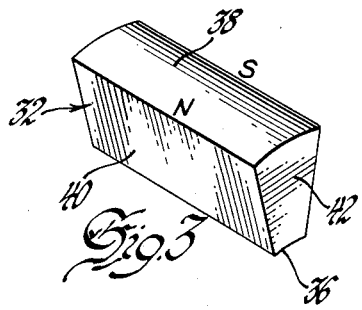
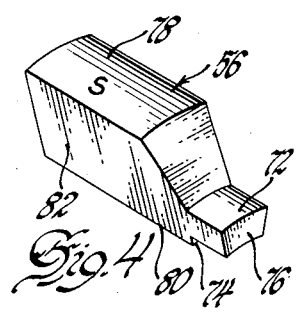
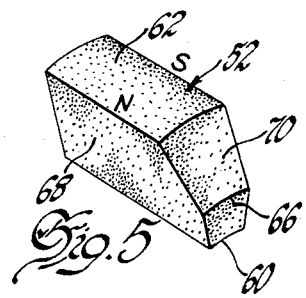
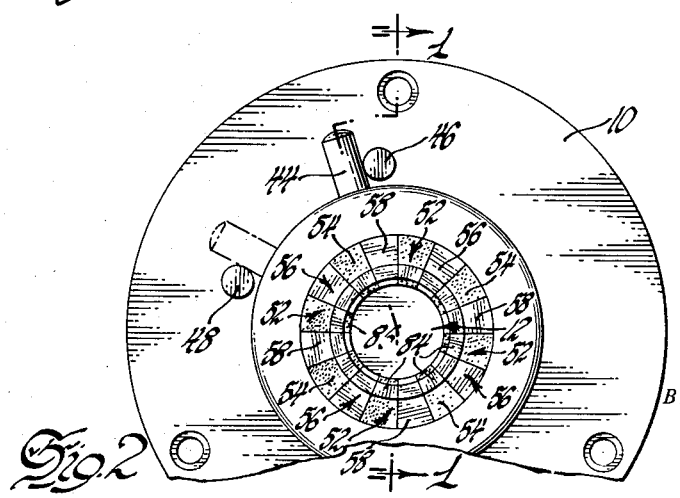
INVENTOR.
Harold W. Ferchland
BY
D. D. McGraw
ATTORNEY Feb. 21, 1961 H. W. FERCHLAND 2,972,485
MAGNETIC CHUCK
Filed Dec. 3, 1958 3 Sheets-Sheet 2
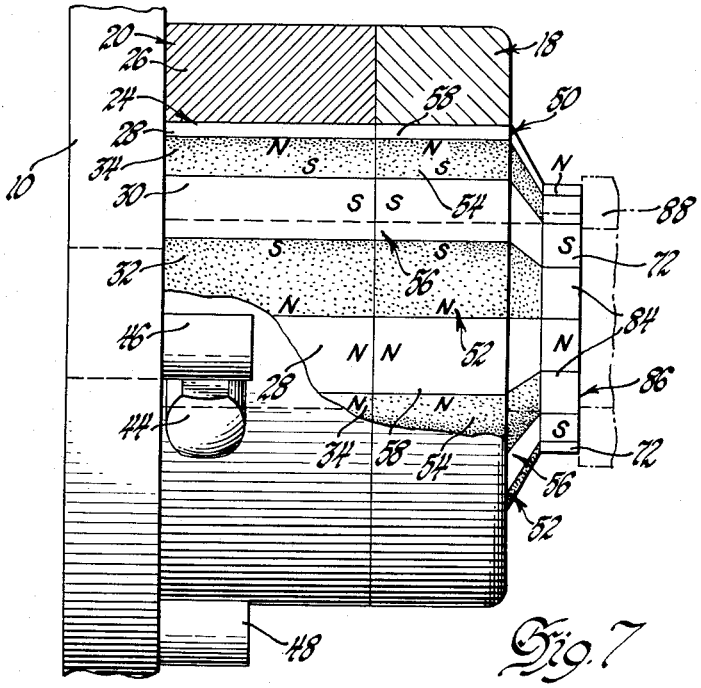
Fig. 7
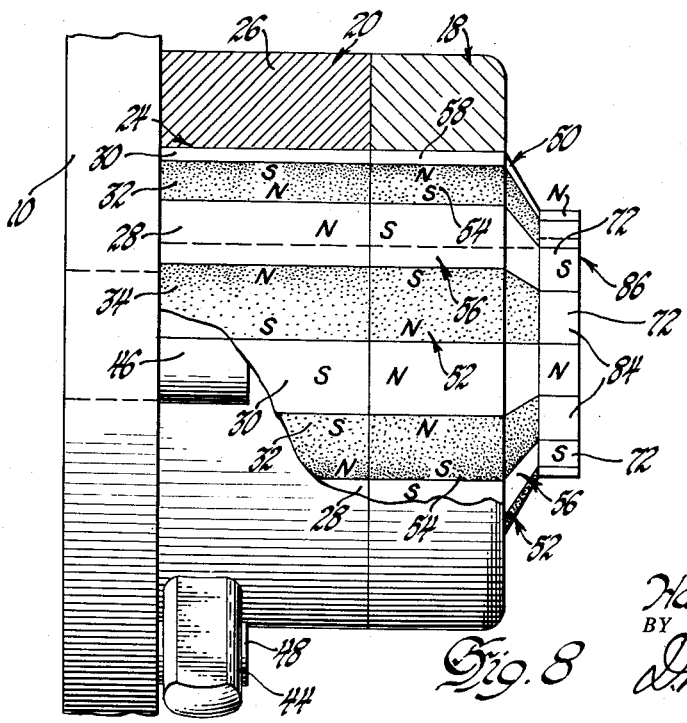
Fig. 8
INVENTOR.
Harold W. Ferchland
BY
ATTORNEY Feb. 21, 1961 H. W. FERCHLAND 2,972,485
MAGNETIC CHUCK Filed Dec. 3, 1958 3 Sheets-Sheet 3

INVENTOR.
Harold W. Ferchland
BY
D.W. McGraw
ATTORNEY

United States Patent Office 2,972,485
Patented Feb. 21, 1961

2,972,485

MAGNETIC CHUCK

Harold W. Ferchland, Birmingham, Mich., assignor to General Motors Corporation, Detroit, Mich., a corporation of Delaware Filed Dec. 3, 1958, Ser. No. 777,933

20 Claims. (Cl. 279—1)

The invention relates to a magnetic chuck and more particularly to a chuck using permanent magnets.

In the past magnetic chucks have been made of two basic types. The electro-magnetic chuck is energized by magnetic induction coils having electricity passing therethrough. Other chucks have been manufactured which use permanent magnets to obtain the desired magnetic field. In either instance, a workpiece is held against a surface by magnetic force. Previous chucks provided a surface which was composed of magnetically energized areas and magnetically dead areas. The dead areas were generally positioned at the center of the chuck and at the area immediately adjacent the outer edges of the chuck. Typical chucks had a dead outer area of approximately one inch diameter for a six inch diameter chuck. This resulted by reason of the construction of the material magnetized and the manner of mounting it in a chuck frame. It has been usual to provide a circular chuck frame, for example, which had radially or arcuately extending apertures formed therein which received the chuck magnets. These magnets were spaced from the chuck frame by lead fillings. This construction rendered a relatively high percentage of the working space unuseable magnetically, thereby resulting in a more bulky chuck than would otherwise be necessary in order to obtain the required magnetic force.

Chucks embodying the invention provide magnetically energized areas along the entire radial extensions of the chuck working face or their equivalents in chucks having conformations other than circular. Such chucks further employ a unique and effective method of energizing and de-energizing the work holding face by controlling the magnetic circuit within the chucks. Other advantages of chucks embodying the invention will become apparent from the description and the claims.

In the drawings:

Figure 1 is a cross section view of a chuck embodying the invention and showing the chuck in its magnetically energized condition.

Figure 2 is an end view of the chuck of Figure 1 taken in the direction of arrows 2—2 of that figure.

Figure 3 is an isometric view of one of the permanent magnets forming a portion of the chuck of Figure 1.

Figure 4 is an isometric view of one of the iron segments forming a portion of the chuck of Figure 1.

Figure 5 is an isometric view of another of the permanent magnets forming a portion of the chuck of Figure 1.

Figure 6 is an isometric view of a non-magnetic segment forming a portion of the chuck of Figure 1.

Figure 7 is a plan view of the chuck of Figure 1 with parts broken away and in section, the view being taken in the direction of arrows 7—7 of that figure.

Figure 8 is a view similar to Figure 7, but with the chuck in its magnetically de-energized position.

Figure 9:
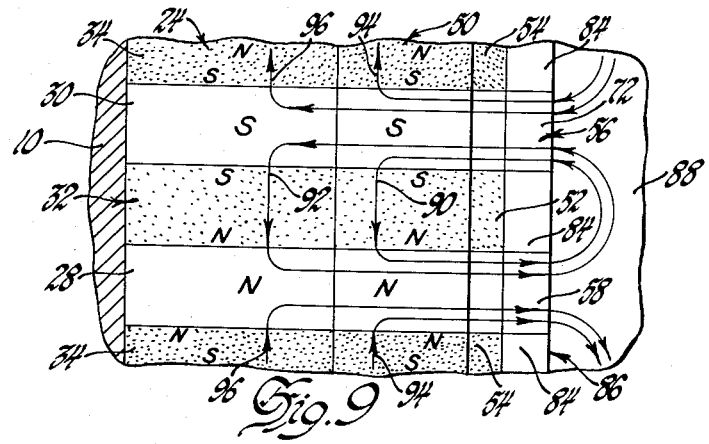
Figure 9 is a diagrammatic view of the magnetic portions of the chuck in its magnetically energized position.

The chuck illustrated in Figures 1 through 8 is mounted on a plate 10 which may form a part of a lathe or may be attached to a work portion of any desired machine in which a chuck may be utilized. A mounting plug 12 has a reduced end 14 which extends through the mounting plate aperture 16 and is press fitted into the aperture. The chuck includes a working holding ring 18 and a chuck control ring 20. Each of the rings is constructed of an inner annulus formed of alternating permanent magnetic segments and iron segments and an outer annulus which operates as a retaining ring. Holding ring 18 is press fitted on the main body 22 of plug 12 while control ring 20 is rotatable on the plug. The control ring 20 is therefore axially positioned between holding ring 18 and mounting plate 10 and may be rotated about its axis.

Control ring 20 includes the inner magnetic annulus 24 and the outer annulus or retaining ring 26. Annulus 24 is made of a plurality of formed segments such as that illustrated in Figure 3. There are two basic types of segments forming the annulus. Iron segments 28 and 30 are alternately spaced with permanent magnetic segments 32 and 34 which are preferably formed of a ceramic magnetic material or a metallic material having a high capacity for retaining permanent magnetism. The iron used in making segments 28 and 30 should have a high induction value, be easily magnetized and de-magnetized, and be of a high purity structure.

The magnet 32 illustrated in Figure 3 is one of the permanent magnetic segments. Iron segments 28 and 30 and permanent magnetic segments 34 are identically shaped and of the same size but have different magnetic properties, as will be described. Segment 32 is somewhat pie-shaped in cross section and has a curved inner surface 36 which is rotatably engageable with the outer surface of plug body 22. The curved outer surface 38 of the segment 32 is in press fitting engagement with the inner surface of the retaining ring 26. Segments 28, 30 and 34 are similarly installed in the ring 26. Side surfaces 40 are preferably positioned at the requisite segmental angles along radii of annulus 24 so that when all of the segments 28, 30, 32, and 34 are assembled in the retaining ring 26, each has a keystone effect with the others to hold them tightly within the retaining ring. The end surface 42 and the rear surface of each of the segments are preferably perpendicular to the surfaces 36, 38 and 40.

Each segment 32 forms a permanent magnet having a north pole and a south pole. One pole is established at each of the two side surfaces 40 rather than in the usual manner of establishing poles at either end of a longitudinally extending magnet. Thus the lines of magnetic flux flow transversely through each segment 32 and substantially along circumferential arcs of annulus 24. The poles are labelled N and S respectively to indicate the north and south poles of the magnet. Segments 34 are similar but so oriented that the north and south poles are oppositely established when the segments are assembled in ring 26. Each of the segments 32 is positioned relative to the two next adjacent segments 34 so the south pole of one adjacent segment 34 faces the south pole of the segment 32 and the north pole of the other adjacent segment 34 faces the north pole of the segment 32. This is best seen in Figures 7 and 8 and the diagrammatic Figures 9 and 10. Since the iron segments 28 and 30 are alternately positioned intermediate the segments 32 and 34, each iron segment is exposed to but one type of magnetic pole. Thus iron segments 28 will be exposed to two north poles and the iron segments 30 will be exposed to two south poles. This results in establishing iron segments 30 as south poles and the iron segments 32 as north poles so that the iron segments are alternately induced to become north and south poles.

Retaining ring 26 may have a pin 44 extending radially therefrom by which the ring 20 may be easily rotated about plug 12. Stops 46 and 48 may be installed in mounting plate 10 so that pin 44 engages one or the other of the stops to limit the rotation of ring 20 and establish desired rotatable positions for magnetic control of the chuck.

Work holding ring 18 is constructed in a manner generally similar to the control ring 20. The inner annulus 50 of ring 18 is formed of alternating permanent magnetic segments 52 and 54 and iron segments 56 and 58. The permanent magnetic segments may be made of the same material as are the segments 32 and 34 of ring 24 and the iron segments may be made of the same material as segments 28 and 30 of that ring.

One of the permanent magnetic segments 52 is illustrated in Figure 5. This segment has an inner surface 60 and an outer surface 62 which are preferably curved to fit plug 12 and retaining ring 64 respectively. The segments 52 are provided with end surfaces 66 and rear surfaces which are generally perpendicular to surfaces 60 and 62 and side surfaces 68 which are similar to surfaces 40 of segments 32. A slanting surface 70 may also be provided adjacent each end surface 66 in order to conform with the overall formation of the inner annulus 50. This formation is provided to reduce the area of the work holding face and concentrates the magnetic flux so that it will influence only the work. A minimum amount of flux leakage is obtained by providing for flux flow direction changes which are minimal consistent with the requisite total flux displacement.

One of the iron segments 56 is illustrated in Figure 4. This segment is generally similar in shape to segment 52. Instead of being formed with the smaller end surface 66, however, the iron segments extend longitudinally at this point to provide projections 72. Each projection is undercut at 74 in order to provide tool clearance when using an internal grinder or boring tool on the workpiece. The end surface 76 of extension 72 is perpendicular to the upper and lower surfaces 78 and 80 as well as to side surfaces 82.

When segments 52, 54, 56, and 58 are assembled in retaining ring 64 and in press fitted relation about plug 12, the air spaces between projections 72 are adjacent the segments 52 and 54. These air gaps are necessary to prevent an internal magnetic short circuit adjacent the workpiece which would permit no flux flow through the workpiece being held. The air spaces are preferably filled by non-magnetic segments 84 which are illustrated in Figure 6. This construction provides an uninterrupted chuck working face. These segments may be formed of any suitable non-magnetic material but are preferably formed of a material also having desirable machining characteristics. It must lend itself to being worked to a very high level of accuracy, provide a smooth finished surface, and must not tend to be redeposited on adjacent materials being worked concurrently. Such materials may be, for example, beryllium copper or a copper-nickel alloy having a high nickel content. An alloy known by the trade name Monel K is typical of such a copper-nickel alloy. Segments 84 in combination with extensions 72 provide a continuous flat work-receiving surface 86 against which a workpiece 88 may be placed and held.

Segments 84 must be machinable so that they provide a smooth surface and do not affect the adjacent iron segment surfaces 76. When the work-receiving surface 86 is worn, dented or scratched, it may be re-worked to provide a new surface. The amount of reworking permitted is determined by the length of extensions 72 and segments 84.

The workpiece 88 is illustrated as an annular ring such as the outer race of a ball bearing assembly. The undercut 74 permits grinding and boring tools to work the entire inner surface of the race and the reduced or necked portion of annulus 50 permits work to be done on the entire outer race surface by requiring unnecessary tool clearances.

The chuck of Figure 1 is shown in Figure 7 in its magnetically energized position whereby workpiece 88 is held agianst face 86. Each of the iron segments 30 and 56, which are magnetically energized to become south poles, are in alignment, are as each of the segments 28 and 58 which have been induced to become north magnetic poles. Magnetic circuits are thus completed which are schematically shown in Figure 9 by closed loop arrows. The magnetic flux indicated by closed loop arrow 90 flows between the poles of one of the permanent magnets 52. This flux line is bent at right angles in the iron segment 58 and continues through the extension 72 of that segment and into workpiece 88. The flux line is curved approximately 180 degrees in the workpiece. The flux line then passes from the workpiece 88 into one of the iron segments 56. It passes through the iron segment 56 and is again bent at right angles to enter the permanent magnet 52. A parallel flux line circuit is also completed through the segments of control ring 24 as illustrated by the closed loop arrow 92.

The adjacent closed loop arrows 94 and 96 indicate flux lines in adjacent circuits which flow in the opposite direction. Figure 9 illustrates clearly the results obtained by utilizing a magnetic control ring as well as a magnetic holding ring. The iron segments 56 and 58 are saturated by lines of magnetic flux originating in each of the rings, and these lines are substantially perpendicular to the workpiece holding face, thereby obtaining the maximum holding and shear strength. The optimum magnetic field strength is thus obtained by aligning the control ring with the holding ring as illustrated by Figures 7 and 9. This position is readily determined by engagement of pin 44 with stop 46.

Figure 10:
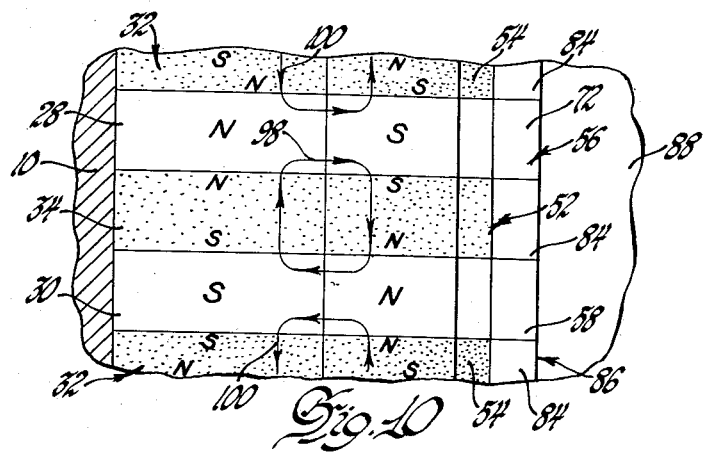
Figure 10 is a diagrammatic view of the magnetic portions of the chuck in its magnetically de-energized position.

When it is desired to remove the workpiece 88 from the chuck face 86, control ring 20 is rotated until pin 44 engages stop 46. This rotates the segments forming the inner annulus 24 of control ring 20 an arcuate distance equal to the arcuate width of two of the segments. Iron segments 28 and 30 of annulus 24 are then respectively aligned with iron segments 56 and 58 of annulus 52. This is illustrated in Figures 8 and 10. At this time the iron segments are so positioned that the north pole iron segments 28 are in direct alignment with the south pole iron segments 56. The south pole iron segments 30 are similarly in direct alignment with the north pole iron segments 58. This results in an internal short circuit of the magnetic flux so that there is no magnetic flux in the area of chuck face 86. The internal circuits are illustrated in Figure 10 by closed loop arrows 98 and 100. Since the non-magnetic segments 84 are included adjacent the workpiece face 86, practically no portion of the internal magnetic circuits will extend beyond the surfaces 66 of the permanent magnets 54. This is the case since lines of magnetic flux will readily seek a path through materials which are subject to magnetic induction rather than passing through anti-magnetic materials.

When the control ring 20 has been rotated an arcuate distance equal to one segment, there is obtained a reversal of the flux flow in the iron segments 56 and 58. This reversal is approximately 180°, as is best illustrated by comparing those portions of arrows 90, 92, 94 and 96 which pass through these segments (see Figure 9) with those portions of arrows 98 and 100 which pass through the same segments. This reversal of flux flow establishes a magnetic "bucking" effect at the chuck face 86 and in the workpiece 88 which prevents any substantial residual magnetism from remaining in the workpiece 88 or in the chuck face. The workpiece therefore may drop freely of the chuck by virtue of its own weight unless it is operatively held in position. It may therefore be removed by the operator without requiring him to pull the workpiece off the chuck against the force of any substantial residual magnetisim.

When using magnetic chucks to hold a workpiece being ground or turned, the chuck must develop sufficient resistance to shear force to permit the work to be done without danger of radial slippage of the workpiece. Chucks made in accordance with the invention above have been found to exert a linear force of approximately 35 pounds, resulting in a shear force of approximately 8 pounds with the total weight of the chuck being somewhat less than 3 pounds. Previous magnetic chucks having a similar shear force developed have weighed several times this amount and have been more bulky in design.

Figure 11:
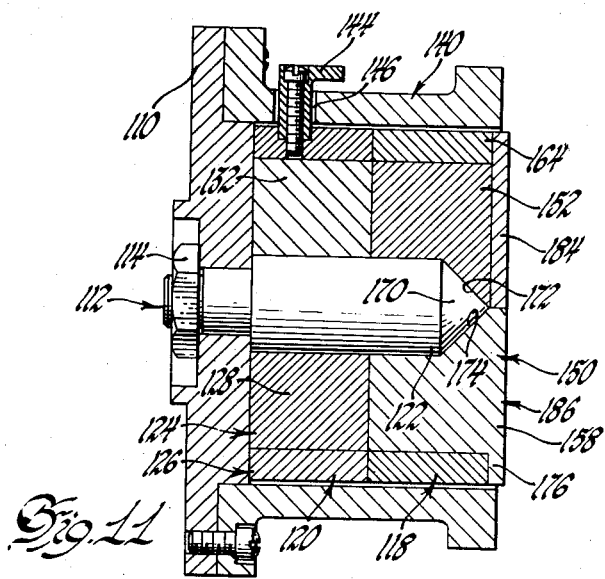
Figure 11 is a cross section view of a modification of the chuck shown in Figure 1.

The modified chuck illustrated in Figure 11 is formed for use as a general utility chuck. The chuck mounting plate 110 may be secured to a machine spindle. The mounting plug 112 is press fitted in the plate 110 and may also be secured by a nut 114 if desired. The chuck includes the work holding ring 118 and the control ring 120. Holding ring 118 is press fitted on the main body 122 of plug 112 while the control ring 120 is mounted for rotation on the plug.

Control ring 120 includes the inner magnetic annulus 124 and outer annulus or retaining ring 126. Annulus 124 is made of a plurality of formed segments similar to the segments of the modification illustrated in Figures 1 through 8. There are two kinds of segments which form this annulus, each of the two kinds having two magnetically different types. Only one magnetic type is shown for each kind of segment. The inner annulus segments shown include the iron segments 128 and the magnetic segments 132. The magnetic arrangement is the same as that illustrated in Figures 1, 7, and 9 as described above.

The work holding ring 118 is formed of an outer annulus 164 which operates as a holding ring for the inner annulus 150. Annulus 150 is formed of a plurality of permanent magnetic segments and iron segments. Each kind of segments has two magnetically different types, as described with regard to the first modification. Only permanent magnetic segments 152 and iron segments 158 are illustrated. The four magnetic types of segments are arranged in the same magnetic manner as are the comparable segments of the work holding ring 18 in Figures 1 through 10. The non-magnetic inserts 184 are placed in front of the permanent magnetic segments 152. These non-magnetic segments may be made of beryllium copper, a copper-nickel alloy, or non-magnetic stainless steel, for example. When seen transversely of the chuck axis, segments 184 are pie-shaped and extend inwardly to the axis of the chuck and outwardly to a circumference substantially matching the circumferential outer surface of ring 164.

Plug 112 is provided with a conically tapered end 170 to permit the construction of the inner annulus 150 in the manner illustrated. The permanent magnetic segments may be provided with inwardly extending tapered ends 172 which are complementary to the surface of plug tapered end 170. Segment ends 172 terminate in a point at the chuck axis. Iron segments 158 are provided with inwardly extending tapered ends 174 which are also complementary to plug tapered end 170 and extend inwardly to the chuck axis. Non-magnetic segments 184 extend radially outward beyond the permanent magnetic segments and terminate at the outer circumference of the retaining ring 164. The iron segments are also provided with radially outward extensions 176 which extend outwardly around retaining ring 164 and terminate at the outer surface of that ring. This construction provides a work receiving surface 186 which is provided with magnetic holding surfaces throughout its entire radial area from its center to its outer circumference.

Control ring 120 may be positioned relative to holding ring 118 by the pin 144 which extends through a slot 146 formed in the chuck casing 140. Slot 146 has one end against which pin 144 abuts when the chuck is in the operative position. Pin 144 is moved in the slot 146 to rotate control ring 120 to the non-energized or inoperative position. Pin 144 will then rest against the other slot end. The two positions are comparable to that illustrated in Figures 7 and 8, respectively.

Chuck casing 140 may be provided, if desired, in order to protect the chuck from dust, chips, etc. It also provides a mounting for any measuring instruments which may be used with the material being worked.

Chucks constructed as illustrated and described provide a working face which is subject to magnetic holding forces over the entire working face area. The magnetic force exerted against the workpiece by the chuck is proportional to the area of the workpiece in contact with the chuck face. The segments forming the magnetic chuck face are generally pie-shaped. It is therefore clear that a larger diameter workpiece, for example, will engage a larger magnetically excited area. This effect has not been realized in magnetic chucks earlier known. Such chucks resulted in the provision of magnetically dead areas at the center of the chuck, circumferentially extending dead area around the outer portion of the working face, and large dead areas intermediate the magnetically excited materials.

The face of magnetic chucks previously known have been made of magnetically energized elements and elements which are susceptible to magnetic energization. These elements have been separated by a lead filler in the air gap. When such chucks are energized, the lead filler permits the chuck face to deform on a low order of magnitude. This deformation is detrimental to the holding quality of the chuck and prevents accurate machining. Chucks embodying the invention will not deform in this manner and may be used to machine workpieces with an accuracy not obtainable by previous chucks. This is obtained by using dissimilar materials such as the non-magnetic segments 84 and iron segments 56 and 58, for example, which are not distorted since they are not made of soft material. The molecular density of the materials used will not allow the free shifting of the segment molecules and will also provide greater surface adhesion between adjacent segments.

The permanent magnetic segments are preferably made of ceramic material of a type which is well known for its magnetic properties. Such ceramic materials have denser flux lines. They also involve no use of critical metals such as nickel, since they are primarily made of barium ferrite. They are also advantageous in that their crystals can be aligned magnetically prior to pressure molding. Beryllium copper is preferably used for the non-magnetic segments 184, since it is non-magnetic and is not magnetically affected by working as is so-called non-magnetic stainless steel.

What is claimed is:

1. In a magnetic chuck, a work holding ring comprising a magnetic annulus having a work-receiving face and including alternately and circumferentially spaced permanent magnetic segments and segments subject to magnetic induction, said magnetic segments having their magnetic poles established along a circumferentially extending arc of said annulus, alternate of said magnetic segments being magnetically aligned in one circumferential direction and the remainder of said magnetic segments being magnetically aligned in the other circumferential direction, and control means for said holding ring for establishing and disestablishing magnetic circuits in said work-receiving face.

2. A permanent magnet type magnetic chuck having a workpiece holding face which may be magnetically excited throughout its width, said chuck comprising a work holding portion having a workpiece mounting surface providing said face and a chuck control portion mounted in continuous contact with and movable relative to said work holding portion, each of said portions having alternately spaced permanent magnets and magnetically inducible elements so arranged that alternating of said elements are induced to become magnetic north poles and the remaining of said elements are induced to become magnetic south poles, said control portion being magnetically aligned in a first position relative to said work holding portion to magnetically energize said face and movable to be magnetically aligned in a second position relative to said work holding portion to magnetically de-energize said face.

3. A magnetic structure for use in a magnetic chuck, said structure comprising a plurality of segments in side-by-side alignment, said segments including at least one group of segments having four magnetically different segments, said group of four segments including, a first segment which is a permanent magnet having a magnetic south pole on one side and a magnetic north pole on the other side, a second segment having one side adjacent the magnetic north pole of said first segment and made of a magnetically induceable material, a third segment adjacent said second segment and which is a permanent magnet having a magnetic north pole on the side adjacent said second segment and a magnetic south pole on the other side, and a fourth magnet having one side adjacent the magnetic south pole of said third segment, and made of a magnetically induceable material, said second and fourth segments being respectively induced to become north and south magnetic poles by their adjacent permanent magnets, the magnetic flux lines passing from said first segment into said second segment being bent a substantially 90° under influence of the magnetic flux lines passing from said third segment into said second segment, said second named flux lines also being bent substantially 90° in said second segment under influence of said first-named flux lines so that all of said flux lines pass out of one end of said second segment in the same direction.

4. In a magnetic chuck, a workpiece holding section having a planar workpiece mounting face, said section comprising alternate magnetic-induceable segments and anti-magnetic segments in side-by-side abutting relationship and substantially perpendicular to said face so that the ends thereof provide the entire surface of said mounting face, said section further comprising magnetic segments intermediate said magnetically induceable segments and behind said anti-magnetic segments and in abutting relation therewith and so magnetically arranged that said magnetic-induceable segments are alternately induced to become north and south magnetic poles and causing the magnetic circuits of said magnetic segments to be completed through said magnetic-induceable segments and outwardly through and beyond said workpiece mounting face, said magnetic-induceable segments extending across the entire width of said face to provide magnetic holding forces thereacross.

5. The magnetic chuck workpiece holding section of claim 4, said magnetic-induceable segments and anti-magnetic segments being radially arranged to form a circular section and provide the workpiece mounting face with magnetic fields extending throughout the entire diameter of said face.

6. The magnetic workpiece holding section of claim 4, said section further being annular and said segments being radially arranged to provide an annular workpiece mounting face having magnetic fields extending throughout the entire length of annular radii thereof.

7. In a magnetic chuck, a workpiece holding annulus for magnetically holding a workpiece against axial and shear forces when said annulus has the workpiece holding face thereof magnetically energized, said annulus having magnetic-induceable elements extending radially and axially of said annulus and magnetic-inducing elements alternately arranged in tight engagement therewith for inducing magnetic flux to pass through the annulus workpiece holding face whereby the face is magnetically energized, and means adjacent said workpiece holding annulus opposite the annulus workpiece holding face and arcuately movable relative thereto for causing said annulus workpiece holding face to be selectively magnetically energized and de-energized.

8. The magnetic chuck structure of claim 7, said workpiece holding annulus having an annular section adjacent the workpiece holding face thereof tapered inwardly on the section exterior surface to concentrate the lines of magnetic flux at the workpiece holding face.

9. The magnetic chuck structure defined by claim 8, said workpiece holding annulus also being radially undercut on the inner surface thereof immediately adjacent the workpiece holding face to provide internal working tool clearance for use with annular workpieces.

10. In a permanent magnet type magnetic chuck, a workpiece holding annulus and a chuck control annulus coaxially mounted in contact with said holding annulus and arcuately movable relative thereto, said holding annulus being comprised of a plurality of alternately arranged and contacting permanent magnets and magnetic-induceable elements, said permanent magnets each having a magnetic north pole at a side contacting one adjacent magnetic-induceable element and a magnetic south pole at a side contacting the other adjacent magnetic-induceable element.

11. The magnetic chuck of claim 10, said magnetic-induceable elements being of a length greater than the said permanent magnets, said annulus also having anti-magnetic elements intermediate said magnetic-induceable elements and at one end of said permanent magnets and of a length equal to the difference in length of the permanent magnets and the magnetic-induceable elements, said magnetic-induceable elements and said anti-magnetic elements cooperating to define an uninterrupted work holding surface.

12. The magnetic chuck of claim 10, said annuli being mounted on pin and mounting plate means therefor and having a cylindrical cover secured to said mounting plate means and extending coaxially about and radially spaced from said annuli and terminating short of the plane of the workpiece holding face of said workpiece holding annulus and providing position determining means for said chuck control annulus relative to said workpiece holding annulus.

13. The magnetic chuck of claim 10, said chuck control annulus comprising circumferentially and alternately arranged and contacting permanent magnets and magnetic-induceable elements respectively alignable with the magnets and elements of said workpiece holding annulus in a first arcuate position of the control annulus to reinforce the magnetic field of said workpiece holding annulus at said work holding surface and alignable in a second arcuate position to short out the magnetic field of said workpiece holding annulus so that there is substantially zero magnetic field force at said work holding surface.

14. The magnetic chuck of claim 13, said chuck control annulus being arcuately positionable at a position intermediate the said first and second arcuate positions and causing the magnetic field in the magnetic-induceable elements of said workpiece holding annulus to reverse direction, thereby creating a magnetic bucking effect to substantially eliminate residual magnetism at the work holding surface.

15. A magnetic chuck having a magnetically controllable work holding annulus providing a work holding face, said annulus comprising an annular retaining ring and a magnetic inner ring mounted in said retaining ring, said inner ring including alternately arranged magnetic segments and magnetic-induceable segments each in contact with the segments adjacent thereto and non-magnetic segments in contact with said other segments and adjacent the ends of said magnetic segments and between adjacent magnetic-induceable segments, the outer axially extending ends of said magnetic-induceable segments and said non-magnetic segments forming the annulus work holding face, each of said segments being generally trapezoidal in cross section to provide a keystone effect for holding all of said segments tightly in said retaining ring.

16. The magnetic chuck of claim 15, each of said segments having a radially inwardly extending section adjacent the work holding face whereby the work holding face is uninterrupted at the center thereof and is provided with magnetically energizeable elements across the entire diameter thereof, the work engaging areas thereof varying throughout the entire face diameter in direct relation to the area of a workpiece being held against the face.

17. The magnetic chuck of claim 15, said non-magnetic segments being made of beryllium copper.

18. The magnetic chuck of claim 15, said non-magnetic segments being made of a copper nickel alloy.

19. A magnetic chuck comprising a work holding section having a work holding surface and a chuck control section mounted adjacent said work holding section and movable relative thereto, permanent magnets in each of said sections for inducing magnetic flux at said surface when said control section is in one position of magnetic alignment relative to said holding section, said chuck control section shorting said flux within said sections when said control section is in a second position of magnetic alignment relative to said work holding section.

20. For use in a magnetic chuck energized by the permanent magnetism residing in permanent magnets, a permanent magnet having a generally rectangular longitudinal cross section and being of substantially greater length than transverse thickness and having oppositely disposed end surfaces and oppositely disposed side surfaces, said magnet being magnetically aligned to provide a magnetic north pole at one of said side surfaces and a magnetic south pole at the other of said side surfaces so that the internal flow of magnetic flux in said magnet flows across the width of said magnet.

References Cited in the file of this patent

UNITED STATES PATENTS

| 2,280,437 | Levesque | Apr. 21, 1942 |
| 2,893,551 | Pirwitz | July 7, 1959 |

Disclaimer 2,972,485.—*Harold W. Ferchland*, Birmingham, Mich. MAGNETIC CHUCK.
 Patent dated Feb. 21, 1961. Disclaimer filed July 31, 1964, by the
 assignee, *General Motors Corporation*.

Hereby enters this disclaimer to claims 1, 2, 3, 7, 10, 13, 14, 19 and 20 of said patent.

[*Official Gazette September 1, 1964.*]

Notice of Adverse Decision in Interference

In Interference No. 92,342 involving Patent No. 2,972,485, H. W. Ferchland, MAGNETIC CHUCK, final judgment adverse to the patentee was rendered Nov. 16, 1962, as to claims 1, 7, 10, 13 and 14.

[*Official Gazette March 30, 1965.*]